United States Patent
Lee

(10) Patent No.: US 12,073,399 B2
(45) Date of Patent: Aug. 27, 2024

(54) SYSTEMS AND METHODS FOR BLOCKCHAIN NETWORK CONGESTION-ADAPTIVE DIGITAL ASSET EVENT HANDLING

(71) Applicant: Shopify Inc., Ottawa (CA)

(72) Inventor: John Jong-Suk Lee, Waterloo (CA)

(73) Assignee: Shopify Inc., Ontario (CA)

( * ) Notice: Subject to any disclaimer, the term of this patent is extended or adjusted under 35 U.S.C. 154(b) by 225 days.

(21) Appl. No.: 17/473,284

(22) Filed: Sep. 13, 2021

(65) Prior Publication Data

US 2023/0088674 A1    Mar. 23, 2023

(51) Int. Cl.
G06Q 20/40    (2012.01)
G06Q 20/38    (2012.01)

(52) U.S. Cl.
CPC ........ G06Q 20/401 (2013.01); G06Q 20/389 (2013.01); *G06Q 2220/00* (2013.01)

(58) Field of Classification Search
CPC . G06Q 20/401; G06Q 20/389; G06Q 2220/00
USPC ......................................................... 705/75
See application file for complete search history.

(56) References Cited

U.S. PATENT DOCUMENTS

| | | | |
|---|---|---|---|
| 6,401,118 B1 | 6/2002 | Thomas | |
| 10,505,726 B1 | 12/2019 | Andon et al. | |
| 10,929,842 B1 | 2/2021 | Arvanaghi et al. | |
| 11,062,284 B1 | 7/2021 | Cunningham et al. | |
| 11,075,891 B1 | 7/2021 | Long | |
| 11,276,014 B2 | 3/2022 | Augustine et al. | |
| 11,295,363 B1 | 4/2022 | Kao et al. | |
| 11,455,694 B2 | 9/2022 | Dinunzio et al. | |
| 11,657,428 B1 | 5/2023 | Ritchie | |
| 2005/0208940 A1 | 9/2005 | Takese | |
| 2007/0174079 A1 | 7/2007 | Kraus | |

(Continued)

FOREIGN PATENT DOCUMENTS

| | | |
|---|---|---|
| CN | 110111102 | 8/2019 |
| CN | 110490752 | 11/2019 |

(Continued)

OTHER PUBLICATIONS

US Office Action dated Apr. 21, 2021, U.S. Appl. No. 16/782,561.

(Continued)

*Primary Examiner* — Courtney P Jones
(74) *Attorney, Agent, or Firm* — Rowand LLP

(57) ABSTRACT

A computer-implemented method and system for blockchain network congestion-adaptive handling of events relating to digital assets, including creation and transfer operations. A congestion metric is measured to determine current congestion of the blockchain network. If below a first threshold level, then digital asset request are implemented using blockchain transactions at layer 1 as they are received. If the metric is above the first threshold level, then the received requests are queued until a queue trigger is detected, whereupon the queued requests are processed at layer 2 and a batch blockchain transaction is used to implement the two or more requests by recording the updated state on chain. When the metric falls below a second threshold, the process reverts to using layer 1 blockchain transactions instead of queueing requests for layer 2 batch processing.

20 Claims, 5 Drawing Sheets

(56) References Cited

U.S. PATENT DOCUMENTS

| | | |
|---|---|---|
| 2010/0131386 A1 | 5/2010 | Shiely et al. |
| 2010/0235218 A1 | 9/2010 | Erhart et al. |
| 2013/0246146 A1 | 9/2013 | Fischer et al. |
| 2014/0129422 A1 | 5/2014 | Zhou |
| 2014/0351953 A1 | 11/2014 | Bhatia |
| 2014/0358629 A1 | 12/2014 | Shivaswamy et al. |
| 2015/0249872 A1 | 9/2015 | Lee et al. |
| 2015/0324840 A1 | 11/2015 | Ramnath Krishnan |
| 2015/0363858 A1 | 12/2015 | Kleinhandler et al. |
| 2016/0171534 A1 | 6/2016 | Linden |
| 2016/0210674 A1 | 7/2016 | Allen et al. |
| 2016/0292672 A1 | 10/2016 | Fay et al. |
| 2017/0011460 A1 | 1/2017 | Molinari et al. |
| 2017/0116693 A1 | 4/2017 | Rae |
| 2017/0140408 A1 | 5/2017 | Wuehler |
| 2017/0155515 A1 | 6/2017 | Androulaki et al. |
| 2017/0221029 A1 | 8/2017 | Lund et al. |
| 2017/0330174 A1 | 11/2017 | Demarinis |
| 2017/0357966 A1 | 12/2017 | Chandrasekhar et al. |
| 2018/0108036 A1 | 4/2018 | Laufenberg et al. |
| 2018/0150869 A1 | 5/2018 | Finnegan |
| 2019/0066065 A1 | 2/2019 | Wright et al. |
| 2019/0073666 A1 | 3/2019 | Ortiz et al. |
| 2019/0130439 A1 | 5/2019 | Handrigan et al. |
| 2019/0139136 A1 | 5/2019 | Molinari et al. |
| 2019/0164157 A1 | 5/2019 | Balaraman |
| 2019/0220836 A1 | 7/2019 | Caldwell |
| 2019/0266616 A1 | 8/2019 | Strutton |
| 2019/0294817 A1 | 9/2019 | Hennebert et al. |
| 2019/0303892 A1 | 10/2019 | Yantis et al. |
| 2019/0311341 A1 | 10/2019 | Rice |
| 2020/0005284 A1 | 1/2020 | Vijayan |
| 2020/0053081 A1 | 2/2020 | Park et al. |
| 2020/0112446 A1* | 4/2020 | Yoshihama ......... G06F 16/1805 |
| 2020/0134660 A1 | 4/2020 | Kadaster |
| 2020/0153607 A1 | 5/2020 | Shi et al. |
| 2020/0242105 A1 | 7/2020 | Rich et al. |
| 2020/0244752 A1 | 7/2020 | Trainor |
| 2020/0364703 A1 | 11/2020 | Joveski |
| 2020/0379981 A1* | 12/2020 | Yoon .................. G06F 16/2379 |
| 2021/0014042 A1 | 1/2021 | Sivathanu |
| 2021/0124616 A1* | 4/2021 | Verma ................ G06Q 30/0601 |
| 2021/0135932 A1* | 5/2021 | Motylinski ......... H04B 7/15521 |
| 2021/0184833 A1* | 6/2021 | Srivastava .............. G06F 16/27 |
| 2021/0241351 A1 | 8/2021 | Francis et al. |
| 2021/0243201 A1 | 8/2021 | Tandel |
| 2021/0256070 A1 | 8/2021 | Tran |
| 2021/0366586 A1 | 11/2021 | Ryan et al. |
| 2021/0383334 A1 | 12/2021 | Krasnyansky |
| 2021/0390531 A1 | 12/2021 | Voorhees |
| 2022/0035936 A1 | 2/2022 | Lin |
| 2022/0076279 A1 | 3/2022 | Renaud |
| 2022/0101316 A1 | 3/2022 | Cramer |
| 2022/0210061 A1 | 6/2022 | Simu |
| 2022/0222364 A1 | 7/2022 | Roberts |
| 2022/0292490 A1 | 9/2022 | Collen |
| 2022/0318233 A1* | 10/2022 | Martinez ............. G06F 16/2379 |
| 2022/0398340 A1 | 12/2022 | Jakobsson |
| 2023/0043095 A1* | 2/2023 | Milam .................. G06N 20/00 |
| 2023/0073545 A1* | 3/2023 | Kurian ................ G06Q 20/065 |
| 2023/0086191 A1 | 3/2023 | Jakobsson |
| 2023/0195855 A1 | 6/2023 | Mavromatis |
| 2024/0046074 A1 | 2/2024 | Lewis |

FOREIGN PATENT DOCUMENTS

| | | |
|---|---|---|
| CN | 108364173 | 1/2021 |
| CN | 109272380 | 1/2023 |
| EP | 3748914 | 12/2020 |
| EP | 4148643 A1 | 3/2023 |
| RU | 2018132715 A | 3/2020 |
| TW | 1674543 | 10/2019 |
| WO | 2013111142 A2 | 8/2013 |
| WO | 2016202952 | 12/2016 |
| WO | 2017197110 | 11/2017 |
| WO | 2020092900 | 5/2020 |

OTHER PUBLICATIONS

US Office Action dated Oct. 7, 2021, U.S. Appl. No. 16/782,561.
US Office Action dated Jan. 20, 2022, U.S. Appl. No. 16/782,561.
US Office Action dated Jul. 26, 2022, U.S. Appl. No. 16/782,561.
Office Action dated Nov. 25, 2022, U.S. Appl. No. 16/782,561.
Office Action dated Apr. 14, 2023, U.S. Appl. No. 16/782,561.
Dialog, Online Searcher, To Be Or Not to Be Competitive Intelligence Tools, Aug. 2019.
US Office Action dated Jul. 27, 2021, U.S. Appl. No. 16/782,556.
US Office Action dated Jul. 11, 2023, U.S. Appl. No. 17/475,240.
Xingxiong Zhu et al; "Application of Blockchain in Document Certification, Asset Trading and Payment Reconciliation"; Journal of Physics: Conference Series, vol. 1187, Issue 5.
European Search Report dated Oct. 10, 2022, EP Application No. 22169579.4.
Sep. 10, 2021, XP055966676, Retrieved from the Internet: URL: http://en.wikipedia.org/w/index.php?title=Non-fungible_token&oldid=3593775#Collectibles.
US Office Action dated Oct. 17, 2022, U.S. Appl. No. 17/344,251.
US Office Action dated Mar. 6, 2023, U.S. Appl. No. 17/479,650.
US Office Action dated Feb. 23, 2024; U.S. Appl. No. 17/893,370.
USPTO; US Office Action relating U.S. Appl. No. 17/955,631 dated Apr. 15, 2024.
Antonopoulos, Andreas; "Mastering Bitcoin Unlocking Digital Cryto-Currencies," O'Reilly Media, Inc., all pages. (Year 2014).
US Office Action, U.S. Appl. No. 17/475,240 dated May 9, 2024.
US Office Action, U.S. Appl. No. 17/903,109 Jun. 3, 2024.
PCT Supplementary International Search Report relating to Application No. PCT/CA2023/050452 dated Jul. 12, 2024.

\* cited by examiner

FIG. 5

SYSTEMS AND METHODS FOR BLOCKCHAIN NETWORK CONGESTION-ADAPTIVE DIGITAL ASSET EVENT HANDLING

TECHNICAL FIELD

The present disclosure relates to digital assets and, in particular, to systems and methods for blockchain network congestion-adaptive creation or transfer of digital assets.

BACKGROUND

A distributed computing network may facilitate exchange of digital assets. In particular, a blockchain-run platform may handle the creation and transfer of digital assets. In some cases, the digital asset may be a token that represents or corresponds to a real-world asset or a unique item. Ownership or trading of the token may be a proxy for ownership or trading of the underlying tokenized asset. In some cases the asset is unique such that the token is a non-fungible token; i.e. the token is also unique.

One of the challenges of using many current blockchain networks is that they have grown so popular that they have become congested and have encountered difficultly with scaling. The congestion of the networks can lead to long lag times in having transactions confirmed and/or excessive resource usage or cost in transaction fees for having a transaction included in a mined block.

It would be advantageous to provide for improved methods and systems for handling digital asset events, such as creation or transfer of a digital asset.

BRIEF DESCRIPTION OF THE DRAWINGS

Embodiments will be described, by way of example only, with reference to the accompanying figures wherein:

FIG. 5 is an example of a home page of an administrator, in accordance with an example embodiment.

DETAILED DESCRIPTION OF EMBODIMENTS

Figure 1:
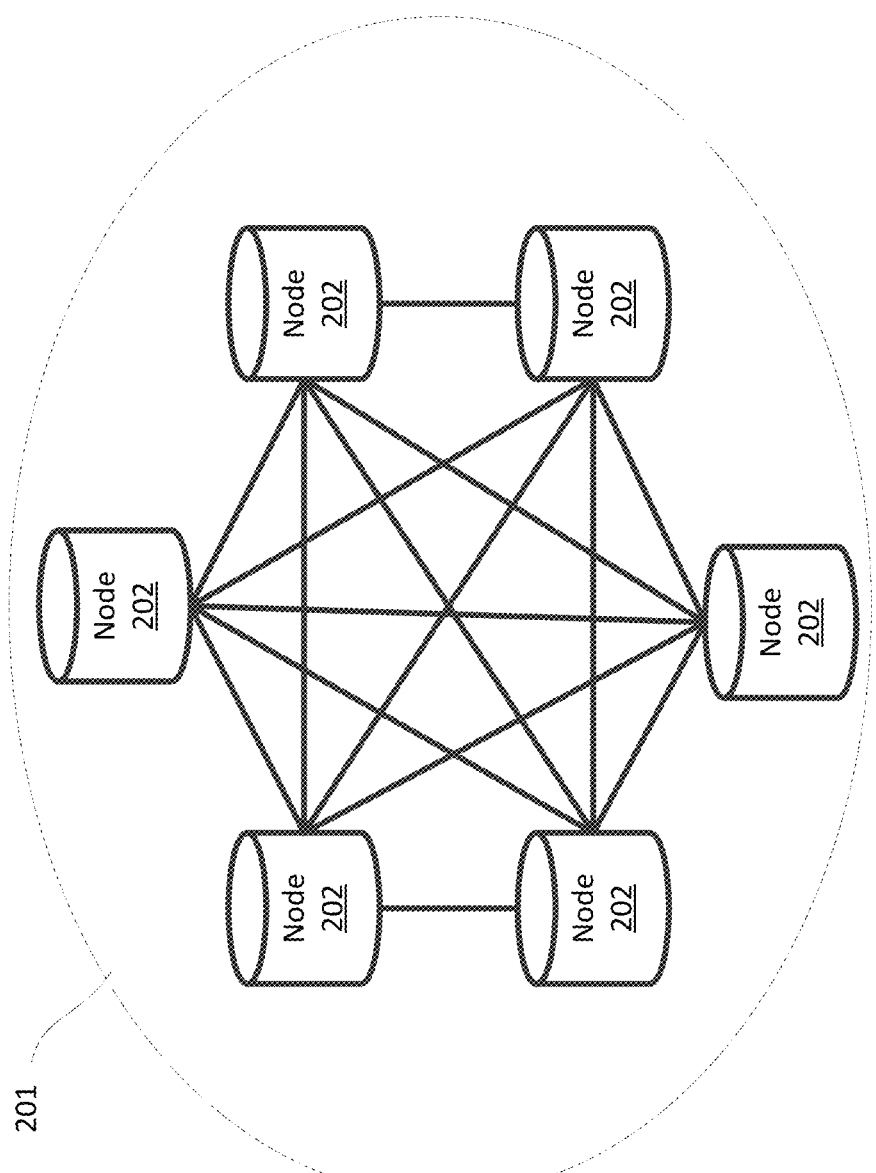
FIG. 1 illustrates an example blockchain network.

In an aspect, the present application discloses a computer-implemented method that may include receiving a first non-fungible token transaction request; obtaining a network congestion metric regarding a congestion measure of a blockchain network; determining that the network congestion metric is above a first threshold level; and responsive to determining that the network congestion metric is above the first threshold level, queuing the first non-fungible token transaction request, and detecting a queue trigger and, in response, generating and propagating a batch blockchain transaction on the blockchain network that implements two or more queued non-fungible token transaction requests including the first non-fungible token transaction request and at least one additional non-fungible token transaction request.

In some implementations, the additional non-fungible token transaction request is received after the first non-fungible token transaction request and is appended to a queue containing the first non-fungible token transaction request.

In some implementations, the network congestion metric is based on one or more of: a count of unconfirmed transactions on the blockchain network, a rate of receipt of new transactions on the blockchain network, an average age of unconfirmed transactions on the blockchain network, a rate of change in number of unconfirmed transactions over a window of time, a cost measure per computing operation, or a transaction fee.

In some implementations, detecting a queue trigger includes one or more of determining that a time elapsed since receipt of the first non-fungible token transaction request has exceeded a maximum time, determining that a count of requests in a queue matches or exceeds a maximum count, or determining that the network congestion metric has fallen below a second threshold level. In some cases, the second threshold level matches the first threshold level.

In some implementations, queuing includes storing at least a portion of data from the first non-fungible token transaction request in memory sufficient to generate a blockchain transaction that implements the first non-fungible token transaction request.

In some implementations, wherein the batch blockchain transaction references a batch processing function and provides an updated NFT state that reflects implementation of the two or more non-fungible token transaction requests.

In some implementations, the first non-fungible token transaction request is a minting request and includes a recipient address. In some cases, the at least one additional non-fungible token transaction request is a further minting request and includes a respective recipient address.

In some implementations, the queued non-fungible token transaction requests include at least one transfer request regarding a previously minted token and the at least one transfer request includes a transferee address and a digital signature.

In some implementations, the method may further include, after generating and propagating the batch blockchain transaction, receiving a second non-fungible token transaction request; obtaining an updated network congestion metric regarding the congestion measure of the blockchain network; determining that the updated network congestion metric is below the first threshold level; and, responsive to determining that the updated network congestion metric is below the first threshold level, generating and sending a single blockchain transaction on the blockchain network to implement the second non-fungible token transaction request alone without queueing.

In another aspect, the present application describes a computing system that includes a processor and memory. The memory may store computer-executable instructions that, when executed, cause the processor to carry out the operations of one or more of the methods described herein.

In yet a further aspect, the present application describes a computer-readable medium storing computer-executable instructions that, when executed by a processor, are to cause the processor to carry out the operations of one or more of the methods described herein. The computer-readable medium may be non-transitory.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and associated payment requests, via an e-commerce platform, and the e-commerce platform may be equipped with transaction/payment processing components or delegate such processing activities to one or more third-party services. An e-commerce platform may be extendible/extensible by connecting one or more additional sales channels representing platforms where products can be sold. In particular, the sales channels may themselves be e-commerce platforms, such as Facebook Shops™, Amazon™, etc.

In the present application, the term "blockchain" is used to include all forms of electronic, computer-based, distributed ledgers. These include, but are not limited to, blockchain and transaction-chain technologies, permissioned and un-permissioned ledgers, shared ledgers, and variations thereof.

A blockchain is a consensus-based, electronic ledger which is implemented as a computer-based, decentralised distributed system made up of blocks which in turn are made up of transactions. Each transaction is a data structure that encodes some data or state. In many cases, the data recorded in a transaction involves the transfer of control of a digital asset between participants in the blockchain system, and includes at least one input and at least one output. In some cases, the transaction may invoke code recorded in another transaction on the blockchain. That code, which may be referenced and executed by having it invoked by a further transaction, may be referred to as a "smart contract".

Each block in the blockchain contains a hash of the previous block so that blocks become chained together to create a permanent, unalterable record of all transactions which have been written to the blockchain since its inception. Transactions may contain small programs known as scripts embedded into their inputs and outputs, which specify how and by whom the outputs of the transactions can be accessed.

Network nodes that receive a new transaction will try to push that transaction out to other nodes in the network, i.e. propagate the transactions on the blockchain network. Before transmitting a new transaction to other nodes, it is "validated"; that is, the transaction is checked against a set of criteria to ensure that it meets the basic requirements for a proper transaction according to the applicable blockchain protocol to avoid flooding the network with invalid transactions.

In order for a transaction to be written to the blockchain, it is incorporated into a block by a node (a "miner" or "mining node") that is designed to collect transactions and form them into blocks. The miner then attempts to complete a "proof of work" with respect to the node. In some cases, the blockchain may rely on "proof of stake" or another mechanism for mining. Proof-of-work miners throughout the blockchain network compete to be the first to assemble a block of transactions and complete the associated proof of work for that block. The successful miner adds its confirmed block to the blockchain and the block is propagated through the network so that other nodes that maintain a copy of the blockchain can update their records. Those nodes receiving a block also "validate" that block and all the transactions in it to ensure it complies with the formal requirements of the protocol.

"Digital assets" refer to assets that are in digital format and that come with the right to use. In particular, a digital asset is self-contained, uniquely identifiable, and is associated with a defined value or ability to use. Examples of digital assets include, among others, digital documents, multimedia files (e.g., photos, audiovisual media, animations, etc.), electronic mails, websites, cryptocurrencies, digital wallets, and asset-backed tokens.

Blockchain technology has created new efficiencies in markets and is often a favored medium in which to exchange digital assets. Blockchains allow parties to unequivocally prove certain aspects of a digital asset, such as ownership, authenticity, and transactions history, without the need to involve a centralized or intermediary entity. Blockchains produce a structure of data with inherent security qualities. Combining cryptography, decentralization and consensus mechanisms, blockchain technology can ensure trust in the transactions that are conducted on blockchain-run platforms without the need to trust in a third-party intermediary.

The rapid growth of software applications and the blockchain-based asset space has given rise to various different types of digital assets. An example of a digital asset class that has been garnering a great deal of interest is non-fungible tokens (NFTs). NFTs are unique digital assets having blockchain-based authenticity, ownership, and transferability features. More specifically, an NFT is a unit of data stored on a blockchain that certifies a digital asset to be unique. NFTs can represent a wide range of assets, physical or digital, including but not limited to: digital art, collectible items, music, digital movies, games, and the like. An NFT functions as a digital certificate of ownership for any assigned digital asset. A key feature of NFTs is that they are not mutually interchangeable—each NFT has a unique identification code and metadata such that it is distinguishable from any other NFT. The unique identity and ownership of an NFT is verifiable using the blockchain ledger.

Blockchain networks, like Ethereum, have token standards that enable developers to deploy NFTs and ensure that they are compatible with the broader ecosystem, including exchanges and wallet services. NFTs can be sold and bought by means of on-chain or off-chain transactions.

A smart contract for generating a digital asset, such as an NFT, may be deployed on a blockchain (e.g., Ethereum blockchain). The smart contract may include code that, when executed, generates an NFT having a unique identifier. This is typically referred to as "minting" the NFT. The event of creation of the NFT and its unique ID may be recorded on the blockchain. The smart contract code may further provide transfer functions, among other functions. NFTs may be transferred between accounts (e.g. addresses) and the ownership change events are recorded in the immutable ledger. In many implementations, supplemental to the overall virtual machine state (e.g. of an Ethereum Virtual Machine), the smart contact is configured to maintain an NFT ledger or state reflecting the state and history of NFT minting and ownership. This may be referred to herein as the "NFT state" or "NFT ledger". In some examples, the NFTs may be implemented using a smart contract that conforms to the Ethereum Request for Comment (ERC) 721 standard regarding non-fungible tokens. In some examples, the NFTs may be implemented using a smart contract that conforms to the ERC-1155 standards regarding multi-token minting. In some other examples, the NFTs may be implemented using a smart contract that conforms to another standard.

One of the challenges with many current blockchain protocols is their growing popularity has resulted in a corresponding increase in network congestion, with a consequent increase in transaction costs. In the Bitcoin network, the cost of having a transaction included in a mined block is referred to as a "transaction fee". In the Ethereum network the cost of having a transaction included in a mined block may include both a transaction fee and a "gas" cost, where the gas cost refers to a cost attributable to the number and/or complexity of code operations required by the transaction. For instance, if a transaction event calls a particular portion of a smart contract, the gas price may depend on the number (or complexity) of computing operations involved in the Ethereum virtual machine executing that portion of the smart contract.

Congestion and cost problems can lead to significant delay in having transactions executed or recorded on-chain. The competition to have transactions included in a mined block more quickly leads to miners selecting only those pending unconfirmed transactions that offer higher fees and greater potential revenue for the miners.

Some blockchain networks have tried to address the cost and congestion problem by creating or deploying off-chain tools or networks within which events or transactions are carried out with a periodic or occasional reconciliation and recordal of state on the actual blockchain. This additional network may be referred to as a "layer 2" protocol, whereas the underlying blockchain protocol/network may be referred to as a "layer 1" protocol. An example in the context of Bitcoin is the Lightning Network. The layer 2 solution to congestion and cost tries to remove the bulk of transactions and events from the layer 1 network so that the higher-cost layer 1 network is only used occasionally to record a periodic state of accounts. This has some drawbacks in that the layer 2 network may be less secure or trustworthy since it lacks the core features of ensuring all transactions are validated and verified by miners before being recorded on the distributed immutable ledger. The work of miners only occurs with occasional recordal of state. Moreover, there may be delays between layer 1 recordals that are as long or longer than the delays inherent in waiting for a higher cost transaction to occur at layer 1. Accordingly, while layer 2 may help reduce the cost of recording each event or transaction at layer 1, it may reduce or undermine some of the advantages of using blockchain technology depending on the application and the implementation.

It would be advantageous, particularly in the context of NFTs, to provide for methods and systems to enable minting and transfer that have the potential to reduce network congestion, congestion-dependent resource usage, and/or network delay.

Reference is first made to FIG. 1, which illustrates, in block diagram form, an example network associated with a blockchain, which may be referred to herein as a blockchain network 201. The blockchain network 201 is a peer-to-peer open membership network which may be joined by anyone, without invitation or without consent from other members. Distributed electronic devices running an instance of the blockchain protocol under which the blockchain network 201 operates may participate in the blockchain network 201. Such distributed electronic devices may be referred to as nodes 202. As examples, the blockchain protocol may be Ethereum, Bitcoin, or another blockchain protocol.

The electronic devices that run the blockchain protocol and that form the nodes 202 of the blockchain network 201 may be of various types including, for example, computers such as desktop computers, laptop computers, tablet computers, servers, mobile devices such as smartphones, wearable computers such as smart watches or other electronic devices.

Nodes 202 of the blockchain network 201 are coupled to one another using suitable communication technologies which may include wired and wireless communication technologies. In many cases, the blockchain network 201 is implemented at least partly over the Internet, and some of the nodes 202 may be located in geographically dispersed locations.

Nodes 202 maintain a global ledger of all transactions on the blockchain, grouped into blocks, each of which contains a hash of the previous block in the chain. The global ledger is a distributed ledger and each node 202 may store a complete copy or a partial copy of the global ledger. Transactions propagated on the network are verified by other nodes 202 prior to inclusion in a mined block so that the validity of the global ledger is maintained. The details of implementing and operating a blockchain network, such as one using the Ethereum protocol, will be appreciated by those ordinarily skilled in the art.

Each transaction typically has one or more inputs and one or more outputs. Scripts may be embedded into the inputs and outputs that specify how and by whom the outputs of the transactions can be used or transferred. The output of a transaction may be an address to which value (or a digital asset) is assigned as a result of the transaction. In some implementations, that value is then associated with that output address, for example as an unspent transaction output (UTXO). A subsequent transaction may then reference that address as an input in order to transfer or otherwise use that value or asset. In some cases, like Ethereum, code in the form of smart contracts may be deployed on the blockchain and may be called or referenced by later transactions to cause the network to execute that code. In this manner, a transaction may cause the network to carry out certain functions, such as the generation (minting) of an NFT or validating and effecting the transfer of an NFT from one owner address to a new owner address.

Nodes 202 can fulfil numerous different functions, from network routing to wallet services, to maintain a robust and secure decentralized public ledger. In some implementations, "full nodes" contain a complete and up-to-date copy of the blockchain, and can therefore verify any transactions (spent or unspent) on the public ledger. "Lightweight nodes" (sometimes referred to as simplified payment verification (SPV) in Bitcoin) do not include a copy of the blockchain but can validate transactions and confirm inclusion of a transaction in a particular block by using a Merkle proof. In some cases, lightweight nodes only download the headers of blocks, and not the transactions within each block. "Mining nodes" engage in the proof-of-work (or proof-of-stake in some cases) activity to race to validate a candidate block and propagate the solution on the network, thereby building the blockchain. Nodes 202 may communicate with each other using a connection-oriented protocol, such as TCP/IP (Transmission Control Protocol).

Figure 2:
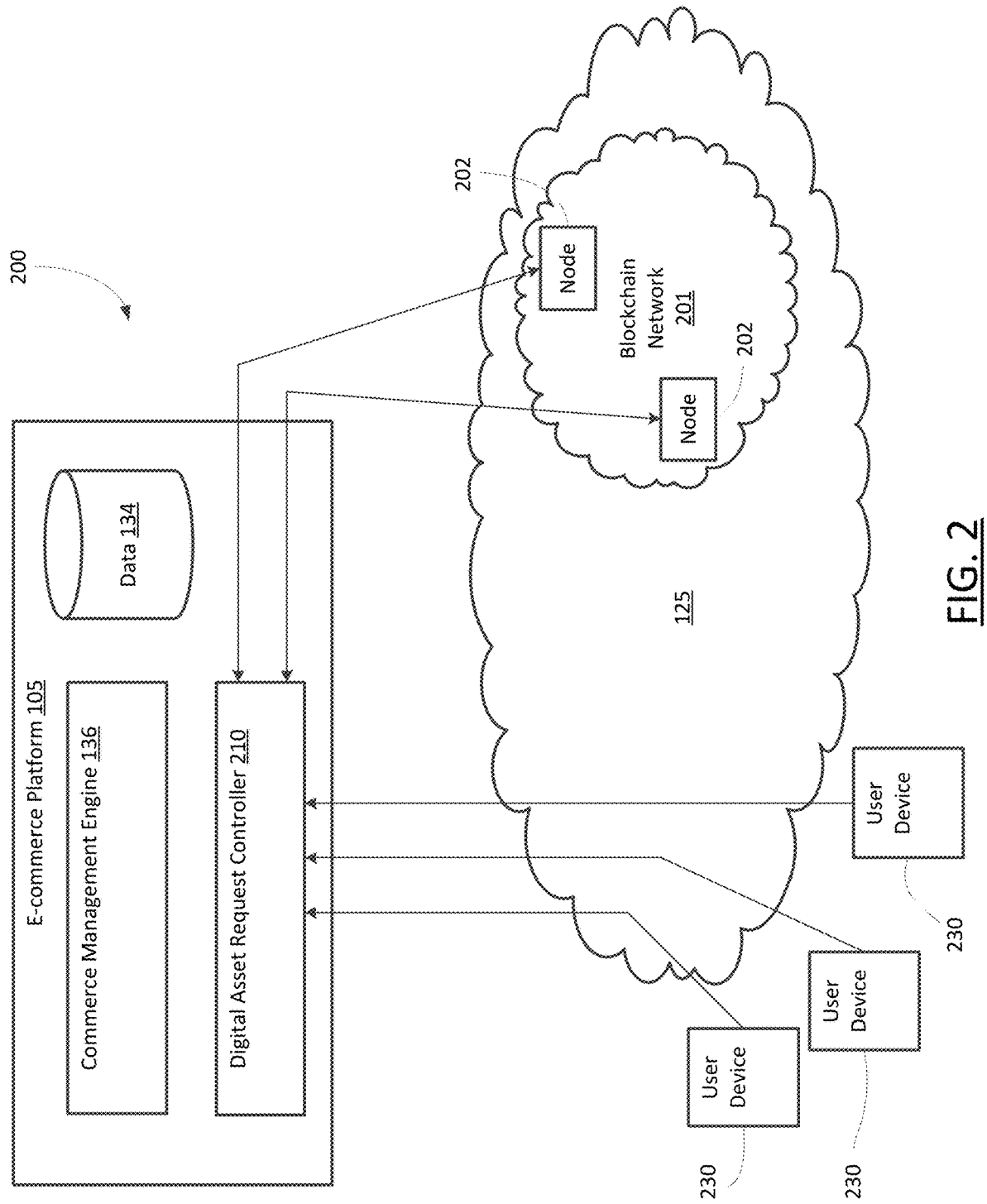
FIG. 2 illustrates an example system for processing events involving non-fungible tokens.

FIG. 2 illustrates an exemplary computing environment 200 consistent with certain disclosed embodiments. As shown in FIG. 2, the computing environment 200 may include an e-commerce platform 105, a plurality of user devices 230, and a communications network 125 connecting one or more of the components of computing environment 200. The communications network 125 may include one or more wired or wireless networks, including the Internet.

As illustrated, the user devices 230 and the e-commerce platform 105 may communicate via the communications network 125. In at least some embodiments, each of the user devices 230 may be a computing device. The user devices 230 may take a variety of forms including, for example, a mobile communication device such as a smartphone, a tablet computer, a wearable computer (such as a head-mounted display or smartwatch), a laptop or desktop computer, or a computing device of another type.

One or more of the user devices 230 may be associated with a merchant or generator of digital assets that the merchant or generator intends to offer to the public via the e-commerce platform 105. One or more of the user devices 230 may be associated with a buyer of digital assets. In particular, one or more of the user devices 230 may be associated with a customer of the merchant offering digital assets via the e-commerce platform 105. In at least some embodiments, the one or more of the user devices 230 may have resident thereon a wallet application. The wallet application may be a standalone mobile application, a web application accessible via a web browser, or a desktop application. The wallet application may be an application that lets the merchant and/or buyer interact with an account. The account may be an account with the e-commerce platform 105 and/or a blockchain network account. For example, the wallet application may allow a buyer to view balances and transactions history, send transactions, encrypt and/or sign information, and connect to other applications. The wallet application may store various types of data, such as keys (e.g., public and/or private keys) for cryptocurrency transactions and digital assets (e.g., tokens such as NFTs) associated with the buyer.

In at least some embodiments, the e-commerce platform 105 may provide a processing facility for transferring digital assets that are sold and purchased on the e-commerce platform. More particularly, components of the e-commerce platform 105 may be configured to control generation and transfer of digital assets that are conducted using a blockchain network.

The e-commerce platform 105 includes a commerce management engine 136, a digital asset request controller 210, and a data facility 134. The commerce management engine 136 may be configured to handle various operations in connection with e-commerce accounts that are associated with the e-commerce platform 105. For example, the commerce management engine 136 may be configured to retrieve e-commerce account information for various entities (e.g., merchants, customers, etc.) and historical account data, such as transaction events data, browsing history data, and the like, for selected e-commerce accounts. In particular, the commerce management engine 136 may obtain account information for e-commerce accounts of buyers and/or merchants that are associated with the e-commerce platform 105.

In some cases, the e-commerce platform 105 may provide generalized e-commerce services enabling merchants to make various products or services available for purchase by customers in virtual stores or other virtual environments or markets. In this example, one of the available products may be a digital asset, such as an NFT. The NFT may be generated using smart contract code deployed and recorded on a blockchain. The smart contract code may further include executable functions for transferring a generated NFT from a current owner address to a new owner address.

The computing environment 200 may further include a blockchain network 201, which is shown deployed within and as part of the communications network 125. In some cases, the e-commerce platform 105 may serve as one of the nodes 202 of the blockchain network 201. In some cases the e-commerce platform 105 may not function as one of the nodes 202 and may send and receive blockchain-related data, such as transactions, via one or more of the nodes 202 in the blockchain network 201. The e-commerce platform 105 may employ various APIs or other functions to securely communicate with the one or more nodes 202 in order to exchange blockchain data, messaging and instructions.

The digital asset request controller 210 may be a software-implemented module containing processor-executable instructions that, when executed by one or more processors in the e-commerce platform 105, cause the e-commerce platform 105 to carry out some of the processes and functions described herein. In some embodiments, the digital asset request controller 210 may be provided as a service that is external to the e-commerce platform 105. In particular, the e-commerce platform 105 may engage the digital asset request controller 210 as a service that is independent of the e-commerce platform 105 and which facilitates processing of requests relating to digital asset generation, sales, or transfers between entities that are associated with the e-commerce platform 105. More broadly, in some implementations, the subject matter of the present application may be employed in manners independent of a particular e-commerce platform. For example, it may be that the digital asset request controller 210 is implemented and deployed so as to be independent of any e-commerce platform.

The digital asset request controller 210 is configured to receive requests to generate and/or transfer digital assets associated with the blockchain network 201. As will be described in greater detail below, the e-commerce platform 105 may be configured to facilitate blockchain-based generation of digital assets and transfers of digital assets between merchants and customers and/or among customers. In particular, the digital asset transfer management engine 210 may enable the e-commerce platform 105 to perform various functions to enable transfers of digital assets using a blockchain network.

Although the digital asset request controller 210 of FIG. 2 is illustrated as a distinct component of the e-commerce platform 105, this is only an example. An engine could also or instead be provided by another component residing within or external to the e-commerce platform 105. In some embodiments, the functions of the digital asset request controller 210 may be implemented within the commerce management engine 136. In some implementations, the digital asset transfer management engine 210 may be provided at least in part by an e-commerce platform, either as a core function of the e-commerce platform or as an application or service supported by or communicating with the e-commerce platform. Alternatively, the digital asset transfer management engine 210 may be implemented as a stand-alone service to clients such as a customer device or a merchant device. In addition, at least a portion of such an engine could be implemented in the merchant device and/or in the customer device. For example, a customer device could store and run an engine locally as a software application.

The data facility 134 may store data collected by the e-commerce platform 105 based on the interaction of merchants and customers with the e-commerce platform 105.

For example, merchants provide data through their online sales activity. Examples of merchant data for a merchant include, without limitation, merchant identifying information, product data for products (e.g., digital assets) offered for sale, online store settings, geographical regions of sales activity, historical sales data, and inventory locations. Customer data, or data which is based on the interaction of customers and prospective purchasers with the e-commerce platform 105, may also be collected and stored in the data facility 134. Such customer data may be obtained on the basis of inputs received via customer devices associated with the customers and/or prospective purchasers. By way of example, historical transaction events data including details of purchase transaction events by customers on the e-commerce platform 105 may be recorded and such transaction events data may be considered customer data. Such transaction events data may indicate product identifiers, date/time of purchase, final sale price, purchaser information (including geographical region of customer), and payment method details, among others. Other data vis-à-vis the use of e-commerce platform 105 by merchants and customers (or prospective purchasers) may be collected and stored in the data facility 134.

The data facility 134 may include customer preference data for customers of the c-commerce platform 105. For example, the data facility 134 may store account information, order history, browsing history, and the like, for each customer having an account associated with the e-commerce platform 105. The data facility 134 may additionally store, for a plurality of e-commerce accounts, wish list data and cart content data for one or more virtual shopping carts.

The digital asset request controller 210 is configured to receive requests from the user devices 230 relating to digital assets. In some cases, the request, if received from a user device 230 associated with a merchant account, may be a request to generate a digital asset. In some cases, the request, if received from a user device 230 associated with a buyer or customer account, may be a request to purchase a generated digital asset. In some cases, the request may be a request to transfer an existing digital asset from one owner address to another owner address, which may or may not be associated with a customer account on the e-commerce platform.

A received request may result in the digital asset request controller 210 generating a blockchain transaction for propagation on the blockchain network 201 that gives effect to the request, whether to generate a digital asset, transfer a digital asset, or otherwise perform an operation to manage the digital asset. In some cases, the blockchain transaction may be generated by the digital asset request controller 210 based on the request and may be provided to the user device 230 from which the request originated in order to be cryptographically signed using the private key associated with the account with which the request is associated.

As noted above, congestion on the blockchain network 201 may lead to higher transaction fees and/or greater latency that is desirable when recording the transaction on chain. Nevertheless, it is preferable to record directly on chain, particularly in the case of NFTs which can have significant value associated with them.

Accordingly, in one aspect, the present application provides for a system and method of effecting digital asset operations that dynamically switches between layer 1 operation and layer 2 operation on the basis of monitored blockchain network conditions. The system, for instance the digital asset request controller 210, determines a congestion metric with respect to the blockchain. If the congestion metric exceeds a first threshold level, then the system may switch from processing received requests using layer 1 transactions to processing received requests using a layer 2 transaction. The layer 2 transactions are periodically or occasionally recorded on chain at layer 1 using a selected mechanism for collating and reconciling state and batch recording transaction data at layer 1. In some examples, at layer 2 the requests are carried out by the digital asset request controller 210 to determine the updated NFT state without using the corresponding functions of the associated smart contract at layer 1, and the updated NFT state is periodically sent to the smart contract in a transaction that updates the NFT state at the smart contract so as to reflect the completion of multiple layer 2 transactions. If the system determines that the monitored congestion metric falls below a second threshold level (which may or may not be the same as the first threshold level), then the system reverts to using layer 1 transaction recordal for received requests. In this manner, the system is able to dynamically adapt to changing blockchain network congestion.

In some implementations, once the system determines that the congestion metric exceeds the first threshold level, any requests received relating to digital asset operations, such as NFT minting or transfers, are saved in a queue. The queue may be a portion of memory in which unrecorded requests are saved for later batch processing. In some cases, the system may conduct operations related to the request off-chain, such as the recordal of transfer operations or new ownership information in a separate ledger or network or system. The system may also or alternatively perform validation or verification operations whilst requests are being queued. The system further monitors for detection of a queue trigger. If the queue trigger is detected, the system batch processes the requests stored in the queue and updates the NFT state using a single blockchain transaction at layer 1. It may then clear the queue. When a request is next received, the system may re-assess the congestion metric to determine whether to continue queuing received requests.

One of the queue triggers may be determination that the congestion metric has fallen below the second threshold level. If that occurs, the system may process a batch transaction at layer 1 for any queued requests at that time and then revert to using layer 1 transaction processing without queuing for any subsequently received requests.

The congestion metric may include any one or more measurable metrics relating to blockchain network congestion. In one example, the congestion metric may be a measure of rate of transaction propagation, e.g. number of new transactions received per second. In some examples, the congestion metric may be a count of unconfirmed transactions. In some examples, the congestion metric may be an average age (e.g. time since propagation/creation) of unconfirmed transactions. In some cases, the congestion metric may be rate of change (increase/decrease) in number of unconfirmed transactions over a window of time. In some examples, the congestion metric may be secondary indicator of congestion, such as transaction fee. The transaction fee may be a measure of current transaction fees on the network, such as an average transaction fee over one or more recently mined blocks. The congestion metric may be a gas price on the Ethereum network or other networks that employ a metric for computing function cost. Various combinations of these measures may be combined to arrive at a congestion metric such as, for example, by way of a linear, additive, and/or multiplicative combination or one or more measures or further combinations thereof. For instance, the count or rate of unconfirmed transactions may be further weighted by gas price per transaction to account for transactions that contain more complex operations. Additionally or alternatively, the congestion metric may not be directly one or more of the foregoing but may rather be a value based on one or more of the foregoing. For example, a raw value of one of the foregoing (or a combination thereof) may be scaled to fall within some defined range to yield the congestion metric.

In some cases, the queue stores (draft) transactions generated as a result of the received requests instead of, or in addition to, storing the requests themselves. The transactions are not propagated on the blockchain network and are instead queued to await batch processing by the system. The batch processing may include collating transactions and/or transaction data into a single batch transaction that is propagated on the blockchain. In some cases, the "transactions" queued for queued requests are not full blockchain protocol-compliant transactions, but contain sufficient data for the system to give effect to those requests by generating and propagating a properly compliant batch transaction. In some implementations, the queued requests or transactions are processed by the digital asset request controller and the resulting updated state/ledger is sent in a batch transaction.

In the case of NFTs, for example when generating an NFT and in some cases when transferring an NFT, a layer 1 transaction calls or invokes a function or other operation embedded in a smart contract stored on the blockchain. For example, a minting function may be provided by the smart contract that causes a blockchain virtual machine to carry out the operations to generate a unique NFT associated with a specific asset or other item. In some cases, the smart contract may include transfer functions to effect recordal of a change in ownership of a particular NFT on the blockchain.

A batch transaction may contain multiple invocations or events relating to two or more digital assets. In some implementations, the requests that are queued (or data regarding those requests) are used as the basis for forming the batch transaction, which may include invocation of multiple smart contract operations in relation to respective digital assets (e.g NFTs). In some cases, a smart contract may contain code for processing multiple requests in a batch transaction. For example, the smart contract may implement a function for batch transfers, where the function may include parameters or arguments for specifying the number of transfers, the transferors' addresses, the transferees' addresses, and respective cryptographic signatures. In another example, the smart contract may implement a function for batch minting, where the function may include parameters or arguments for specifying the integer number of NFTs to be minted, the recipients' addresses, and asset identifiers. Each respective asset identifier may include a URI or other identifier for pinpointing the asset represented by that NFT. The batch function may be configured to update the smart contract-maintained NFT state so as to reflect implementation of the queued transactions, where the updated state is determined by the digital asset request controller at layer 2 outside of the blockchain network. Other batch functions may also be defined within the smart contract.

In some cases, the batch transaction processing functions are within the same smart contract as the regular transaction processing functions. In some cases, the batch transaction processing functions are within a different smart contract also deployed and recorded on chain.

To prevent malicious invocation of the batch function, in some embodiments the smart contract may restrict availability or authorization to invoke the batch function to authorized entities. For example, an allow list (also referred to as a "whitelist") of authorized IP addresses may be maintained defining where the batch transaction must originate from. In some cases an oracle may maintain a whitelist or allow list that defines which entity or entities may use the batch function. The smart contract owner and/or its delegates may have authorization to modify the allow list.

The queue trigger may include one or more conditions or events detectable by the system. In some examples, the queue trigger may include an elapsed time since storage of the first (oldest) request in the queue, such as an elapsed t seconds. In some example, the queue trigger may be determination that the number of queued requests exceeds a predetermined maximum count, i.e. the quantity of requests in the queue. In some cases, it may include a byte size of queued requests and/or queued transactions. In some cases, it may be based on at least N requests having been received over a certain time period, e.g. a rate of requests received. In some cases, the system may be configured to detect a queue trigger based on an elapsed maximum time or a maximum count, whichever is reached first. As noted above, one queue trigger may be determination that the congestion metric has fallen below the second threshold.

Figure 3:
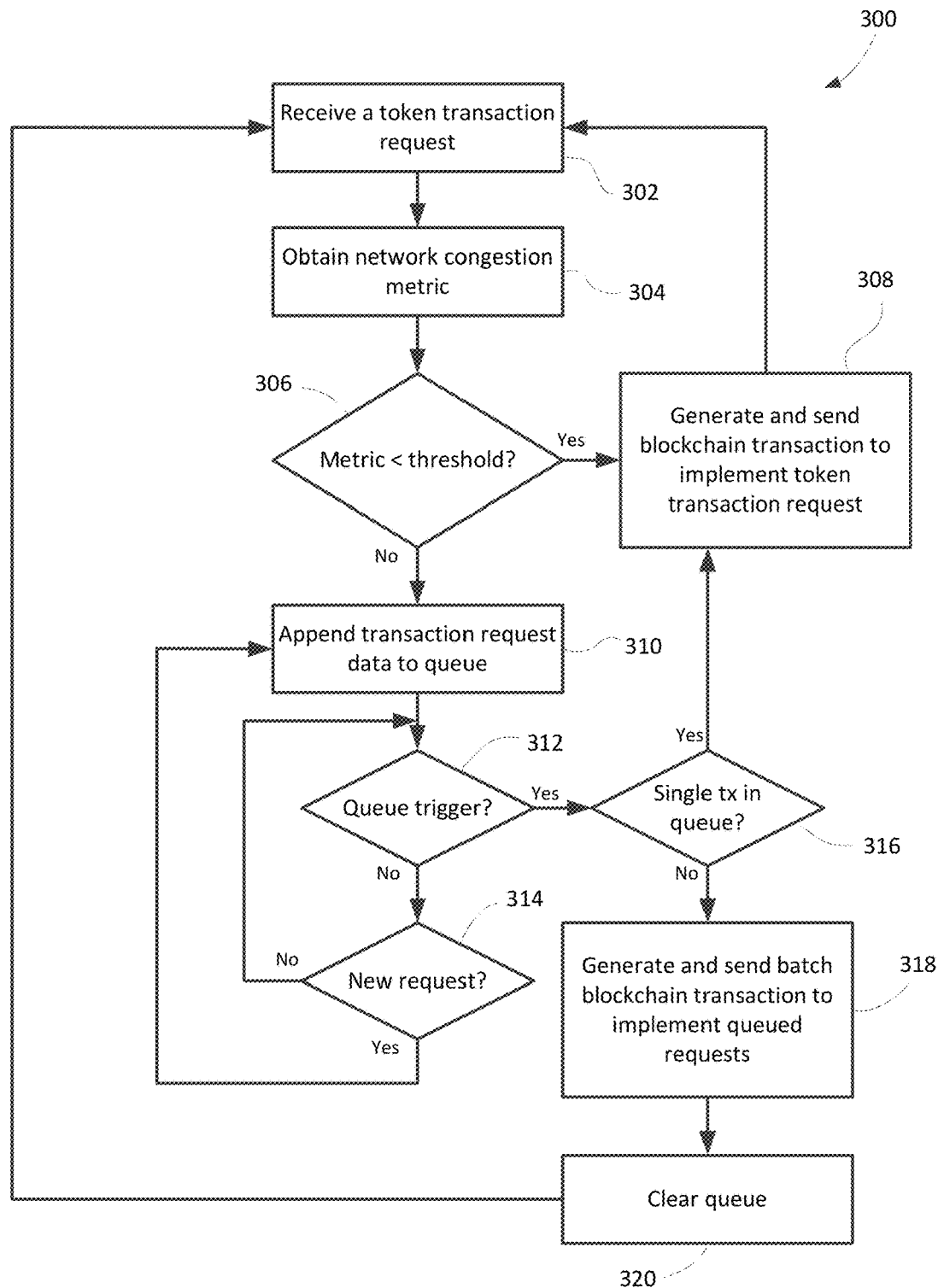
FIG. 3 illustrates, in flowchart form, one example method for processing events involving non-fungible tokens based on a network congestion metric.

Reference is now made to FIG. 3, which shows, in flowchart form, one example method 300 of processing digital asset event requests. The method 300 may be implemented by a computing device having suitable computer-executable instructions for causing the computing device to carry out the described operations. The method 300 may be implemented, in whole or in part, by a dedicated computing device, such as a node of a blockchain network. In some cases, the method 300 may be implemented by a dedicated module, engine, application, or other software component, among a set of hardware and software components for implementing an e-commerce platform. The method 300 may be implemented by the digital asset request controller 210 in some examples.

In operation 302, a transaction request is received. The transaction request relates to a digital asset. The digital asset may be associated with a physical asset or an online resource. In one example, the transaction request is a request to generate an NFT associated with the asset. In another example, the transaction request is a request to transfer ownership of an existing NFT associated with the asset. The request may include a digital signature of an owner or requestor. The request may include a reference to a specific blockchain smart contract associated with the NFT and, in some cases, a specific function within that smart contract. The request may include an address associated with a recipient of the NFT.

In operation 304, a network congestion metric is measured or obtained. The congestion metric may include any one or more quantities or values relating to blockchain network congestion. In one example, the congestion metric may be a measure of rate of transaction generation or propagation, e.g. a count of the number of new transactions received over a time window, such as a second, five seconds, a minute, etc. In some examples, the congestion metric may be a current count of unconfirmed transactions, e.g. the number of pending transactions in a mempool. In some examples, the congestion metric may be an average age of the unconfirmed transactions, e.g. average time since receipt of the unconfirmed transactions. In some cases, the congestion metric may be a rate of change in number of unconfirmed transactions over a window of time, e.g. the speed or rate of growth in unconfirmed transactions, whether positive or negative. In some examples, the congestion metric may be a secondary indicator of network congestion, such as the size or quantity of the transaction fees. The transaction fee may be a measure of current transaction fees on the network, such as an average transaction fee over one or more recently mined blocks. The congestion metric may be a gas price on the Ethereum network or other blockchain networks that employ a metric for computing operational cost. Various set or subsets of these measures may be combined to arrive at a congestion metric. As an example, the count or rate of unconfirmed transactions may be further weighted by gas price per transaction to account for transactions that contain more complex operations.

Once the congestion metric is obtained, then it is compared to a first threshold level, as indicated by operation 306. The first threshold level may be selected or set based on the nature of the metric being measured or obtained, and based on how quickly the method 300 is designed to switch to layer 2 implementation. If the metric is below the first threshold level, then the method 300 continues to operate at layer 1 and the received request results in generation and propagation of a blockchain transaction so as to implement the request, as shown by operation 308. That is, a blockchain transaction is generated and output on the blockchain network. The blockchain transaction may include a reference to a smart contract or function within a smart contract that, when executed, causes the network to carry out the requested operation, e.g. NFT generation or NFT ownership transfer, and records that state change on the blockchain.

The method 300 continues to operate in this manner, processing received requests using layer 1 blockchain transactions, unless the congestion metric exceeds the first threshold level, in which case the method 300 proceeds to operation 310. In operation 310, the received request is appended to a queue. The queue may be a memory or a portion of memory or a data structure in a portion of memory designated for holding received requests to await batch processing.

In operation 312, it is determined whether a queue trigger has been detected. If not, then as shown by operation 314 the method 300 remains awaiting new requests, which are then appended to the queue whilst awaiting detection of a queue trigger. The queue trigger may include one or more detectable conditions or events that cause batch processing of the queue contents. In one example, the queue trigger may include a maximum time since queuing of the first (e.g. oldest) request in the queue. In another example, the queue trigger may include the number of queued requests reaching a maximum count, i.e. the quantity of requests in the queue. In a further example, the queue trigger may include a size of queued requests and/or queued transactions, e.g. the number of bytes occupied by the queued requests or transactions. Multiple conditions or events may be designated as queue triggers. For instance, the queue trigger may be a maximum age of oldest request or a maximum count of queued requests, whichever occurs first.

Another queue trigger may be a detection that the congestion metric has fallen below a second threshold level. The second threshold level may be the same as the first threshold level in some cases. In some cases, the second threshold level may be lower than the first threshold level to prevent frequent switching if the congestion metric is at or near the threshold level.

The foregoing refers to queuing of received requests. In some implementations, the queue may include only a portion of data from each received request. The portion of data would include such data as may be needed to formulate or generate a compliant blockchain transaction implementing the request. In some cases, rather than queueing requests or request data the queue may contain a draft blockchain transaction configured to implement the request. That is, the queue may contain a plurality of blockchain transactions in draft form. In yet another implementation, instead of queuing requests, the system processes each request to update a locally-maintained NFT state, and the queue or memory stores the current NFT state as it is updated at 2 layer with each "queued" request as it is received.

When, in operation 312, a queue trigger is detected, operation 316 assesses whether there is a single request (or transaction) in the queue. This deals with the boundary condition where a queue trigger is detected after only a single request has been queued. In this case, the method 300 may immediately revert to layer 1 operation and process the queued request in the normal course as a layer 1 blockchain transaction in operation 308. It will then, on receiving a next request in operation 302, assesses whether the congestion metric still merits use of queued processing.

In the case where there is more than one queued request, then in operation 318 a "batch blockchain transaction" is generated and propagated on the blockchain network. The batch blockchain transaction implements more than one of the requests in the queue. In some instances, the batch blockchain transaction implements all requests in the queue. In some cases, the requests may be implemented using more than one batch blockchain transaction. For example, in some implementations, NFT generation requests may be grouped together in one batch transaction and NFT transfer requests may be grouped together in a separate batch transaction, on the basis that they may reference different functions or portions of a smart contract or different smart contracts, in some examples.

The batch blockchain transaction is a single blockchain transaction in terms of the blockchain protocol. Within that single blockchain transaction, two or more requests are contained and implemented.

In one example implementation, the batch blockchain transaction may include calling a smart contract function more than once. In some cases, it may include calling a dedicated batch function within a smart contract, where the batch function receives parameters that include a count of requests and data for each of the included requests. This may include, for example, a data structure containing NFT identifiers, a data structure containing asset identifiers, a data structure containing recipient address data, a data structure containing one or more digital signatures, and other such data. In some implementations, the batch blockchain transaction invokes a custom NFT update function provided by the smart contract, and the batch blockchain transaction provides the updated NFT state that results from the layer 2 processing of all the queued requests.

Once the batch blockchain transaction has been generated, it is propagated on the blockchain network. Once the batch blockchain transaction is included in a mined block by one of the blockchain mining nodes, the resulting state change from the multiple queued requests is reflected in the data recorded on the blockchain. The NFT state or ledger maintained by the smart contract is updated to reflect implementation of the multiple queued requests, without the associated gas cost of invoking the smart contract code for carrying out each request as a smart contract operation.

Advantageously, the batch blockchain transaction may have lower overall fees and/or gas costs than implementing each of the requests individually in its own dedicated blockchain transaction. Moreover, by collating requests in to a batch transaction the transaction may have a higher overall transaction fee that will ensure the batch transaction is mined expeditiously, whereas if the requests were in individual blockchain transactions the individual transaction fee in each transaction may be too low (even if collectively they are higher than the batch transaction fee) for miners to include those individual transactions in the candidate blocks upon which they work. As such, collating the requests into a batch transaction may, under conditions of network congestion, lead to faster execution and recordal of the requests despite the delays inherent in queueing the requests first. In addition, by delaying the processing of individual requests through queuing, in some instances the queue trigger is a reduction in the congestion metric to below a second threshold level, which may mean that when the batch blockchain transaction is generated and propagated due to the queue trigger the blockchain network is operating in a lower congestion and cost condition, resulting in more efficient and cost effective implementation of the requests.

Once the requests in the queue have been processed in a batch blockchain transaction, then the queue is cleared or emptied, as indicated by operation 320, and the method 300 reverts to operation 302 to await receipt of a new request. When that new request is received, the congestion metric is again obtained and compared to the first threshold level to determine whether to handle the new request at layer 1 or to queue it for layer 2 handling.

Although the foregoing description refers to the generation or minting of NFTs and the transfer of NFTs as example requests, in some cases requests may relate to other operations or events involving NFTs. In some other cases, the method and system may be implemented for request handling relating to digital assets other than NFTs.

Example E-commerce Platform

Although integration with a commerce platform is not required, in some embodiments, the methods disclosed herein may be performed on or in association with a commerce platform such as an e-commerce platform. Therefore, an example of a commerce platform will be described.

Figure 4:
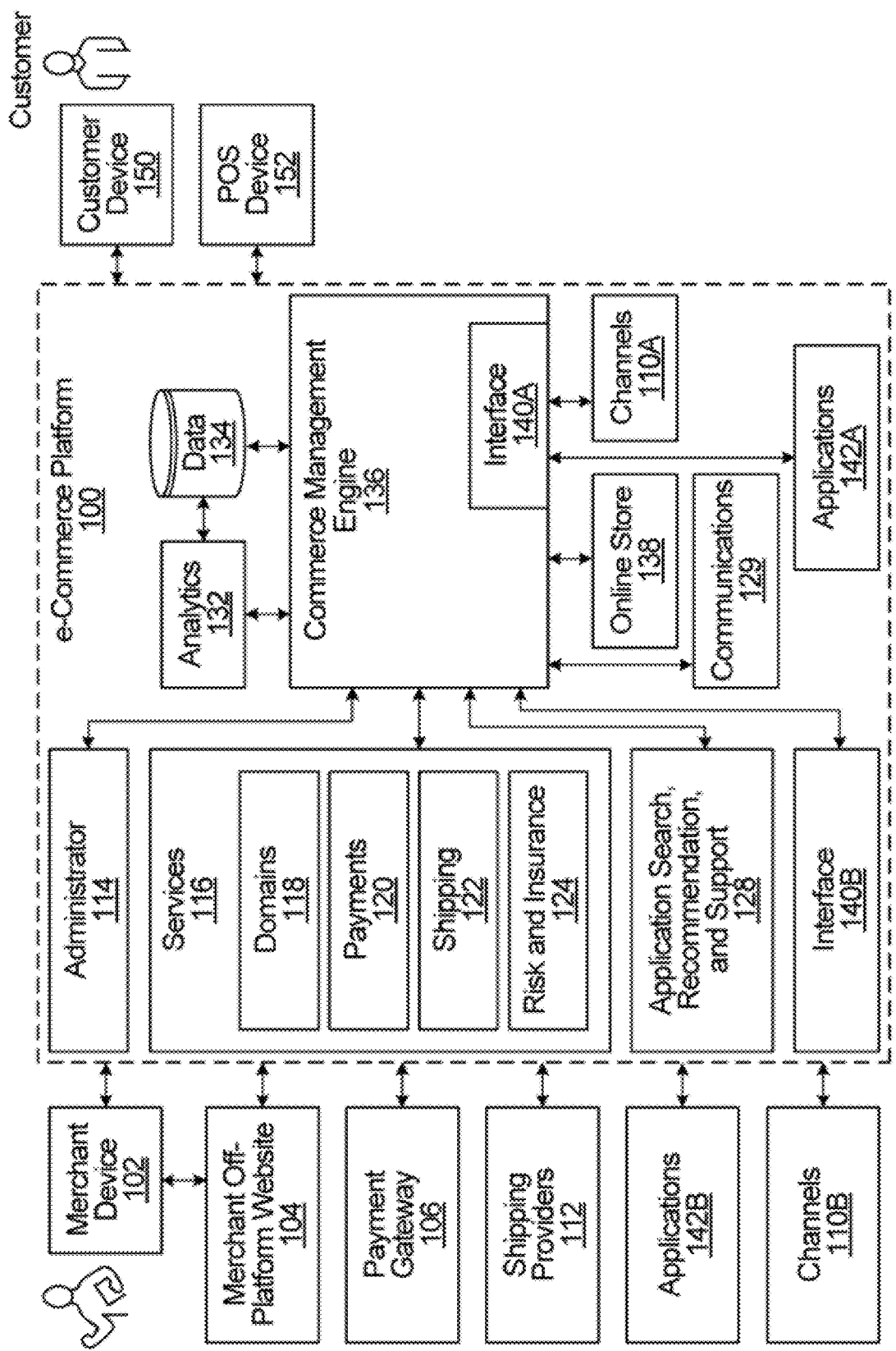
FIG. 4 is a block diagram of an e-commerce platform, in accordance with an example embodiment.

FIG. 4 illustrates an example e-commerce platform 100, according to one embodiment. The e-commerce platform 100 may be exemplary of the e-commerce platform 105 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 4, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the c-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the c-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (Saas), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the c-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 5:
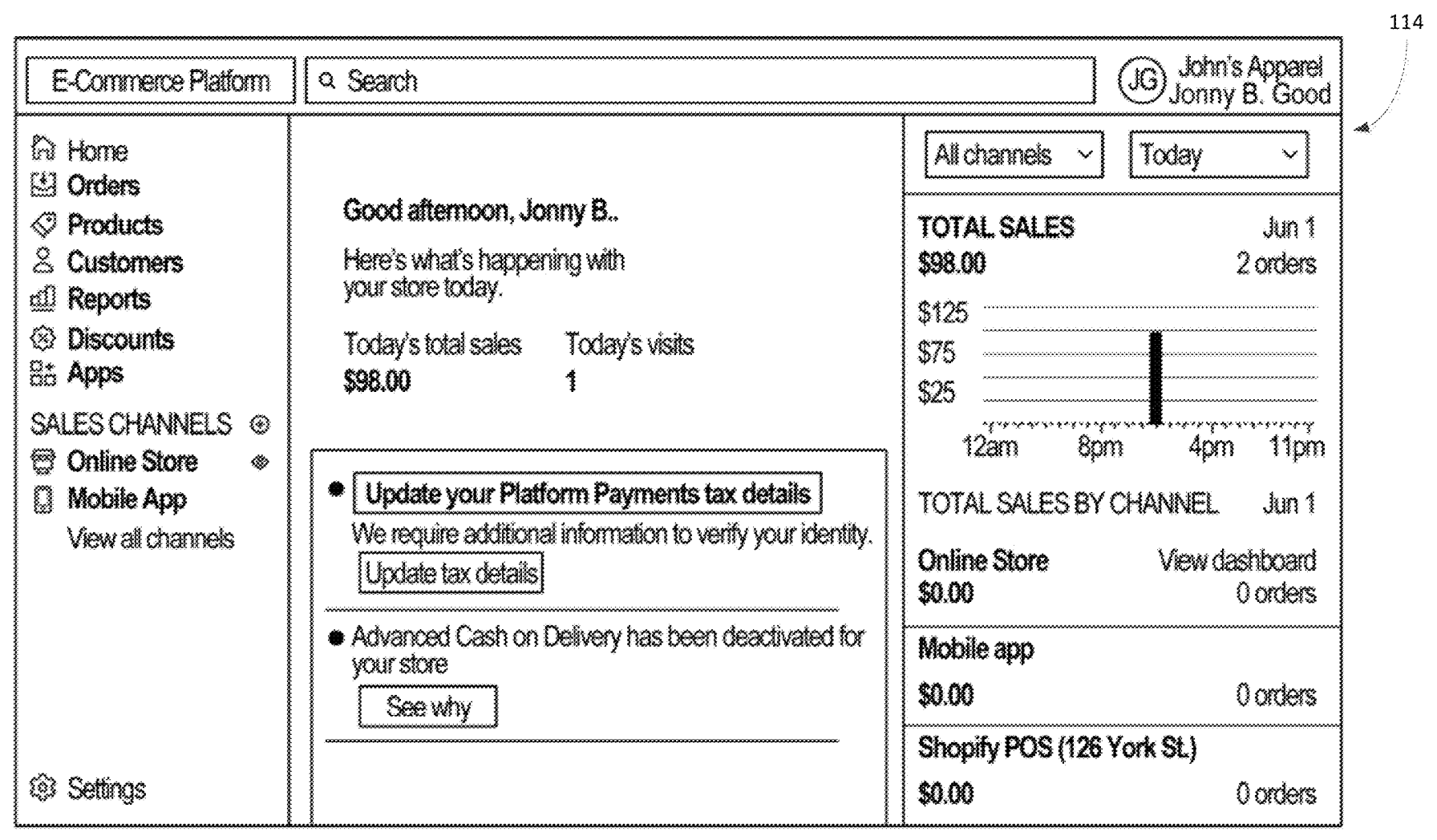

FIG. 5 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown in FIG. 8. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 4, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the case of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways 106 and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
receiving a first non-fungible token transaction request;
obtaining a network congestion metric regarding a congestion measure of a blockchain network;
determining that the network congestion metric is above a first threshold level; and
responsive to determining that the network congestion metric is above the first threshold level, queuing the first non-fungible token transaction request in a queue until detecting a queue trigger, the queue trigger including determining that the network congestion metric has fallen below a second threshold level;
in response, generating and propagating a batch blockchain transaction on the blockchain network that implements two or more queued non-fungible token transaction requests including the first non-fungible token transaction request and at least one additional non-fungible token transaction request; and
after the non-fungible token transaction requests in the queue have been processed in the batch blockchain transaction, clearing the queue and awaiting receipt of a new non-fungible token transaction request.

2. The method of claim 1, wherein the at least one additional non-fungible token transaction request is received after the first non-fungible token transaction request and is appended to the queue containing the first non-fungible token transaction request.

3. The method of claim 1, wherein the network congestion metric is based on one or more of: a count of unconfirmed transactions on the blockchain network, a rate of receipt of new transactions on the blockchain network, an average age of unconfirmed transactions on the blockchain network, a rate of change in number of unconfirmed transactions over a window of time, a cost measure per computing operation, or a transaction fee.

4. The method of claim 1, wherein detecting a queue trigger further includes one or more of determining that a time elapsed since receipt of the first non-fungible token transaction request has exceeded a maximum time, or determining that a count of requests in a queue matches or exceeds a maximum count.

5. The method of claim 1, wherein the second threshold level matches the first threshold level.

6. The method of claim 1, wherein queuing includes storing at least a portion of data from the first non-fungible token transaction request in memory sufficient to generate a blockchain transaction that implements the first non-fungible token transaction request.

7. The method of claim 1, wherein the batch blockchain transaction references a batch processing function and provides an updated NFT state that reflects implementation of the two or more non-fungible token transaction requests.

8. The method of claim 1, wherein the first non-fungible token transaction request is a minting request and includes a recipient address.

9. The method of claim 8, wherein the at least one additional non-fungible token transaction request is a further minting request and includes a respective recipient address.

10. The method of claim 1, wherein the queued non-fungible token transaction requests include at least one transfer request regarding a previously minted token and the at least one transfer request includes a transferee address and a digital signature.

11. The method of claim 1, further comprising, after generating and propagating the batch blockchain transaction,
receiving a second non-fungible token transaction request;
obtaining an updated network congestion metric regarding the congestion measure of the blockchain network;
determining that the updated network congestion metric is below the first threshold level; and
responsive to determining that the updated network congestion metric is below the first threshold level, generating and sending a single blockchain transaction on the blockchain network to implement the second non-fungible token transaction request alone without queueing.

12. A computing system, comprising:
a processor; and
a memory storing computer-executable instructions that, when executed by the processor, are to cause the processor to:
receive a first non-fungible token transaction request;
obtain a network congestion metric regarding a congestion measure of a blockchain network;
determine that the network congestion metric is above a first threshold level;
responsive to determining that the network congestion metric is above the first threshold level, queue the first non-fungible token transaction request in a queue until detecting a queue trigger, the queue trigger including determining that the network congestion metric has fallen below a second threshold level;
in response, generate and propagate a batch blockchain transaction on the blockchain network that implements two or more queued non-fungible token transaction requests including the first non-fungible token transaction request and at least one additional non-fungible token transaction request; and
after the non-fungible token transaction requests in the queue have been processed in the batch blockchain transaction, clear the queue and await receipt of a new non-fungible token transaction request.

13. The computing system of claim 12, wherein the at least one additional non-fungible token transaction request is received after the first non-fungible token transaction request and is appended to the queue containing the first non-fungible token transaction request.

14. The computing system of claim 12, wherein the network congestion metric is based on one or more of: a count of unconfirmed transactions on the blockchain network, a rate of receipt of new transactions on the blockchain network, an average age of unconfirmed transactions on the blockchain network, a rate of change in number of unconfirmed transactions over a window of time, a cost measure per computing operation, or a transaction fee.

15. The computing system of claim 12, wherein the instructions, when executed by the processor, are to cause the processor to further detect a queue trigger by one or more of determining that a time elapsed since receipt of the first non-fungible token transaction request has exceeded a maximum time, or determining that a count of requests in a queue matches or exceeds a maximum count.

16. The computing system of claim 12, wherein the second threshold level matches the first threshold level.

17. The computing system of claim 12, wherein the instructions, when executed by the processor, are to cause the processor to queue by storing at least a portion of data from the first non-fungible token transaction request in the memory sufficient to generate a blockchain transaction that implements the first non-fungible token transaction request.

18. The computing system of claim 12, wherein the batch blockchain transaction references a batch processing function and provides an updated NFT state that reflects implementation of the two or more non-fungible token transaction requests.

19. The computing system of claim 12, wherein the instructions, when executed by the processor, are to further cause the processor to, after generating and propagating the batch blockchain transaction, receive a second non-fungible token transaction request;

obtain an updated network congestion metric regarding the congestion measure of the blockchain network;

determine that the updated network congestion metric is below the first threshold level; and responsive to determining that the updated network congestion metric is below the first threshold level, generate and send a single blockchain transaction on the blockchain network to implement the second non-fungible token transaction request alone without queueing.

20. A non-transitory, computer-readable medium storing computer-executable instructions that, when executed by a processor, are to cause the processor to:

receive a first non-fungible token transaction request;

obtain a network congestion metric regarding a congestion measure of a blockchain network;

determine that the network congestion metric is above a first threshold level;

responsive to determining that the network congestion metric is above the first threshold level, queue the first non-fungible token transaction request in a queue until detecting a queue trigger, the queue trigger including determining that the network congestion metric has fallen below a second threshold level;

in response, generate and propagate a batch blockchain transaction on the blockchain network that implements two or more queued non-fungible token transaction requests including the first non-fungible token transaction request and at least one additional non-fungible token transaction request; and after the non-fungible token transaction requests in the queue have been processed in the batch blockchain transaction, clear the queue and await receipt of a new non-fungible token transaction request.

* * * * *